(12) United States Patent
Schmidt et al.

(10) Patent No.: US 6,668,657 B2
(45) Date of Patent: Dec. 30, 2003

(54) PRESSURE SENSOR

(75) Inventors: Norbert Schmidt, Eppstein (DE); Joachim Acht, Frankfurt am Main (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/922,454

(22) Filed: Aug. 3, 2001

(65) Prior Publication Data

US 2002/0020222 A1 Feb. 21, 2002

(30) Foreign Application Priority Data

Aug. 9, 2000 (DE) .......................... 100 39 609

(51) Int. Cl.$^7$ ................................................ G01L 7/08
(52) U.S. Cl. .................... 73/715; 73/716; 73/719; 73/722; 73/735
(58) Field of Search .................. 73/715, 716, 719, 73/722, 729, 744, 735; 600/490, 485, 573, 488; 116/34

(56) References Cited

U.S. PATENT DOCUMENTS

| | | | | |
|---|---|---|---|---|
| 3,989,911 A | | 11/1976 | Perry ........................... | 200/83 |
| 4,735,090 A | * | 4/1988 | Jeffrey et al. .................. | 73/706 |
| 5,602,373 A | | 2/1997 | Sauer et al. ................... | 200/82 |
| 5,652,391 A | * | 7/1997 | Kingsford et al. ............ | 73/706 |
| 5,734,109 A | * | 3/1998 | Thanscheidt .................. | 73/744 |
| 6,120,458 A | * | 9/2000 | Lia et al. ...................... | 600/490 |
| 6,255,609 B1 | * | 7/2001 | Samuelson et al. ........... | 200/83 |
| 2001/0015105 A1 | * | 8/2001 | Gerst et al. .................... | 73/715 |
| 2002/0023500 A1 | * | 2/2002 | Chikuan et al. ............... | 73/715 |

FOREIGN PATENT DOCUMENTS

| | | | | |
|---|---|---|---|---|
| EP | 0 676 785 | | 1/1995 | .......... H01H/35/34 |
| GB | 2 247 316 | | 7/1990 | ............. G01L/9/14 |

OTHER PUBLICATIONS

J. Böettcher, "Software korrigiert Drucksensor" Jul. 21, 1989, pp. 38–42.

* cited by examiner

*Primary Examiner*—Ren Yan
*Assistant Examiner*—Marissa Ferguson
(74) *Attorney, Agent, or Firm*—Cohen, Pontani, Lieberman & Pavane

(57) ABSTRACT

A pressure sensor for a motor vehicle includes a sensor housing and a base. A pressure bore through the base leads to a pressure space delimited on one side by the base and on the opposite side by a diaphragm connected sealingly to the base. An actuating element is carried on a side of the diaphragm facing away from the pressure space. The actuating element actuates a sensor element in the sensor housing via a non-contact actuation. For protection against leakage due to a break in the diaphragm, a sealing cap surrounds the diaphragm and the actuating element and is sealingly connected to the base.

5 Claims, 1 Drawing Sheet

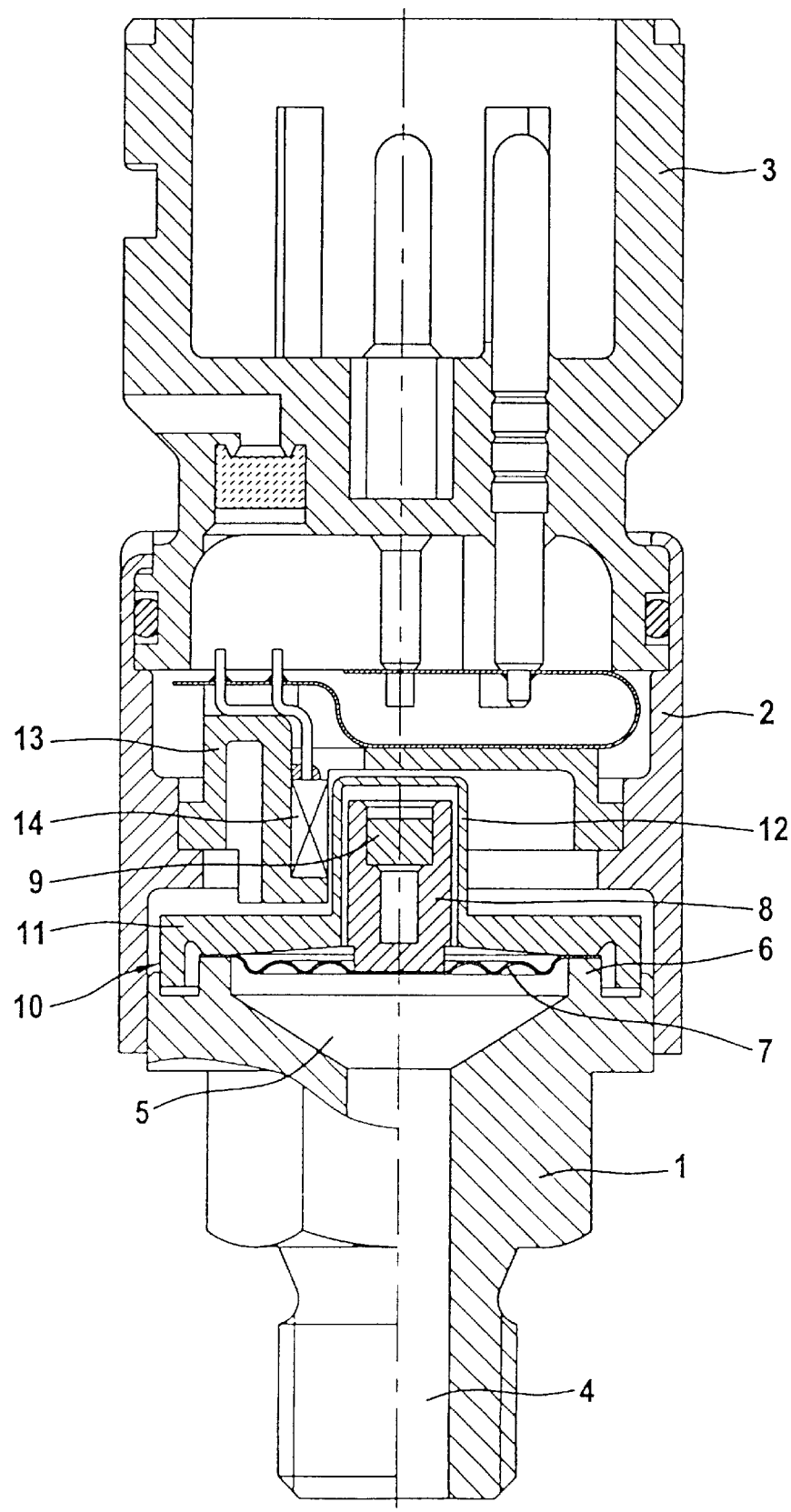

PRESSURE SENSOR

BACKGROUND OF THE INVENTION

1. Field of the Invention

The invention relates to a pressure sensor for a motor vehicle having a sensor element arranged in a sensor housing, a base connected with the sensor housing, a pressure space defined by the base and a diaphragm which is held via a sealed connection to the base, a pressure bore extending through base to the pressure pressure space, and an actuating element arranged on a side of the diaphragm facing away from the pressure space for non-contact actuation of the sensor element.

2. Description of the Related Art

Pressure sensors having diaphragms with actuators arranged thereon on a side facing away from a pressure space are used in technology for various tasks and are generally known. Where such pressure sensors are concerned, it is often important to prevent leaks, even after lengthy use. This prevention of leaks is required when the medium acting upon the pressure sensor is a medium such as, for example, hydraulic fluid that is harmful to the immediate surroundings of the pressure sensor or to the environment or when the medium is a flammable medium such as, for example, fuel. In a motor vehicle, the escape of fuel from a pressure sensor increases the risk of fire. Even if the the medium is not harmful or flammable, the medium escaping from pressure sensors may damage control devices or make them temporarily inoperative. The diaphragm is a critical component in terms of leakage, because the diaphragm may break as a result of frequent actuation or even due to a material fault, thus resulting in a sudden serious leak.

To avoid the risk of medium escaping from a pressure sensor, the pressure sensor could be provided with cladding, in a similar way to the double-walled cladding of oil tanks to be installed in the ground. Such cladding is costly and not entirely reliable, however, because electrical leads would have to be led sealingly out of it and the cladding would also have to be sealed off relative to the base of the pressure sensor.

SUMMARY OF THE INVENTION

It is an object of the present invention to design a pressure sensor having an actuator mounted on a diaphragm such that the pressure sensor is protected against leakage in a cost-effective and reliable manner.

According to an embodiment of the present invention, the object is met by a pressure sensor having a diaphragm and an actuating element that are surrounded by a sealing cap connected sealingly to the base of the pressure sensor housing.

In the sensor according to the present invention, the sealing cap defines a further pressuretight shutoff of the pressure space arranged behind the diaphragm. Since this further shutoff of the pressure space is only required to surround the pressure space and the actuating element, the further shutoff of the pressure space can be made relatively small, so that it does not appreciably increase either the costs of the pressure sensor or its construction volume.

The sealing cap may be designed in the form of a hat with a flange which faces one side of the diaphragm with a clearance therebetween such that the flange limits the maximum flexion of the diaphragm. The sealing connection of the sealing cap is made to the base. A middle region of the sealing cap has a cylinder leading over the actuating element. This configuration of the sealing cap has a double function. The first function is to ensure the prevention of leaks in the event of a failure of the diaphragm and the second function is to limit the maximum bulge of the diaphragm under high pressure. Accordingly, the sealing cap prevents overstretching and breaking of the diaphragm even during the occurrence of pressure peaks.

For use in hydraulic systems and, in general, in a motor vehicle, the actuating element of the pressure sensor may be a magnet and the sensor element a Hall effect device and the sealing cap may consist of a nonmagnetic material. In principle, however, the flexion of the diaphragm may also be measured in another non-contact way such as, for example inductively or capacitively.

The diaphragm and the sealing cap may be made from high-grade steel so that the pressure sensor may be cost-effectively produced and so that the pressure sensor can withstand even aggressive media without the risk of corrosion.

The sealing cap may be connected via a sealed connection to the diaphragm and the base particularly cost-effectively when the sealing cap is connected to the diaphragm and the base by welding.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing is a longitudinal sectional view of a pressure sensor according to an embodiment of the present invention.

DETAILED DESCRIPTION OF THE PRESENTLY PREFERRED EMBODIMENTS

Referring to the FIGURE, the pressure sensor includes a base 1 via which the pressure sensor may be screwed into a threaded bore, not shown. A sensor housing 2 arranged so that the base 1 and a contact part 3 are held by the sensor housing 2. The contact part 3 sealingly closes an upper part of the sensor housing 2 and includes an electrical connection device such as a conventional bayonet plug via which the pressure sensor acquires its necessary electrical connections.

A pressure bore 4 is arranged through the base 1 to a pressure space 5 which is formed by a recess in the upper end face of the base 1 and which is delimited laterally in the upper region of the base 1 by a peripheral shoulder 6 of the base 1. The shoulder 6 is connected to the edge of an elastic diaphragm 7 covering the pressure space 5. A spacer element 8 is seated on a side of the diaphragm 7 which faces away from the pressure space 5. An actuating element 9 comprising a magnet is held in the spacer element 8.

A sealing cap 10 in the shape of a hat is arranged over the diaphragm 7 and the spacer element S. The sealing cap 10 includes a flange 11 (i.e., the brim of the hat) and a cylinder 12. The flange 11 rests on the diaphragm 7 in the region of the shoulder 6. In the region of the pressure space 5, a clearance is defined between the at rest position of the diaphragm 7 and the flange 11 such that the maximum flexion of the diaphragm during operation is limited by the flange 11. The base 1, the diaphragm 7, and sealing cap 10 may be made of high-grade steel so that the flange 11 is sealingly connected to the diaphragm 7 and the shoulder 6 of the base 1 via a peripheral welded joint. The cylinder 12 of the sealing cap 10 surrounds the spacer element 8 and the actuating element 9.

A sensor element 14 is arranged in a carrier 13 in the sensor housing 2. The sensor element 14 may, for example, comprise a conventional Hall effect device for detecting the position of the actuating element 9 which is a magnet.

When a pressure of the measurement medium acts upon the pressure space 5 via the pressure bore 4, the diaphragm 7 bulges upward elastically to a greater or lesser extent as a function of the pressure. The spacer element 8 together with the actuating element 9 thereby move to a corresponding extent. The movement is detected by the sensor element 14, that is to say the Hall effect device, thereby generating a pressure-dependent sensor signal.

If the diaphragm 7 breaks, the measurement medium only comes up against the sealing cap 10. Leakage of the measurement medium from the sensor is thereby prevented by the sealed connection between the flange 11, the elastic diaphragm 7, and the peripheral shoulder 6 of the base 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pressure sensor for a motor vehicle, comprising:

a sensor housing having a sensor element;

a base arranged on said sensor housing and having a bore therethrough;

a diaphragm connected to said base with a sealed connection, wherein a pressure space in operative connection with said bore is defined by said base and said diaphragm;

an actuating element arranged on a side of said diaphragm facing away from said pressure space for non-contact actuation of said sensor element; and a sealing cap surrounding the side of said diaphragm facing away from said pressure space and said actuator and connected to said base with a sealed connection, said sealing cap being arranged between said the side of said diaphragm facing away from said pressure space and said sensor housing.

2. The pressure sensor of claim 1, wherein said sealing cap comprises a hat-shaped design comprising a flange facing said diaphragm with a clearance therebetween for limiting a maximum flexion of said diaphragm and a middle region comprising a cylinder arranged over said actuating element, said flange being sealed to said base.

3. The pressure sensor of claim 1, wherein said actuating element is a magnet, said sensor element is a Hall effect device and said sealing cap comprises a nonmagnetic material.

4. The pressure sensor of claim 1, wherein said base, said diaphragm, and said sealing cap are made from a high-grade steel.

5. The pressure sensor of claim 1, wherein said sealed connection between said sealing cap and said base and said sealed connection between said diaphragm and said base each comprise a welded connection.

* * * * *